United States Patent
Khudenko

Patent Number: 5,798,043
Date of Patent: Aug. 25, 1998

[54] CONTROL OF ANAEROBIC WASTEWATER TREATMENT

[75] Inventor: Boris Mikhailovich Khudenko, Atlanta, Ga.

[73] Assignee: Khudenko Engineering, Inc., Atlanta, Ga.

[21] Appl. No.: 982,030

[22] Filed: Dec. 1, 1997

[51] Int. Cl.$^6$ ........................................... C02F 3/30

[52] U.S. Cl. ................ 210/603; 210/605; 210/614; 210/630; 210/631

[58] Field of Search ........................ 210/603, 605, 210/610, 614, 625, 630, 631, 623

[56] References Cited

U.S. PATENT DOCUMENTS

| | | | |
|---|---|---|---|
| 3,047,492 | 7/1962 | Gambrel | 210/625 |
| 4,029,575 | 6/1977 | Bykowski et al. | 210/625 |
| 4,614,587 | 9/1986 | Andersson et al. | 210/603 |
| 5,075,007 | 12/1991 | Morper et al. | 210/614 |
| 5,094,852 | 3/1992 | Davis et al. | 210/614 |
| 5,185,079 | 2/1993 | Dague | 210/603 |
| 5,500,123 | 3/1996 | Srivastava | 210/603 |
| 5,587,079 | 12/1996 | Rowley et al. | 210/605 |
| 5,630,942 | 5/1997 | Steiner | 210/603 |
| 5,651,891 | 7/1997 | Molop et al. | 210/625 |
| 5,670,047 | 9/1997 | Burlee | 210/614 |

Primary Examiner—Christopher Upton

[57] ABSTRACT

A method of controlling wastewater treatment in multi step system comprising at least one anaerobic step and at least one carbon dioxide stripping step by a combination of (1) recuperable abiotic species and carbon dioxide stripping, wherein the recuperable species can be metal ions such as calcium and iron, the said species are charged in the treatment system and form soluble carbonates maintaining the carbonic acid equilibrium and pH in anaerobic process steps and recuperated and retained in the system as insoluble carbonates or hydroxides formed in the carbon dioxide stripping step, and (2) conditioning the sludge by cultivating methanogens in the sludge in a dedicated process zone called sludge conditioner, and recycling the conditioned sludge in the reactor, wherein the volatile fatty acids are rapidly consumed by thus provided methanogens.

Dramatic reduction in reagent requirements for pH and other purposes is achieved. The system can be controlled using excess reagent content and excess conditioned sludge supply. In extreme situations, simple automatic control can be used. The process can be automated using a differential pH metering, wherein one pH meter is reading pH in the carbon dioxide stripping reactor, and another pH meter measures pH in a portion of water with carbon dioxide stripped. The level of pH in a water portion with depleted carbon dioxide indicates whether carbon dioxide needs to be additionally stripped or the recycle rate from the stripping step should be increased, and/or the conditioned sludge recycle needs to be increased.

14 Claims, 1 Drawing Sheet

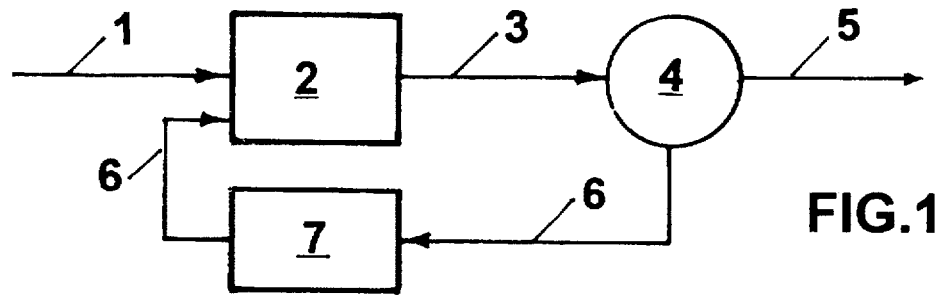
FIG.1
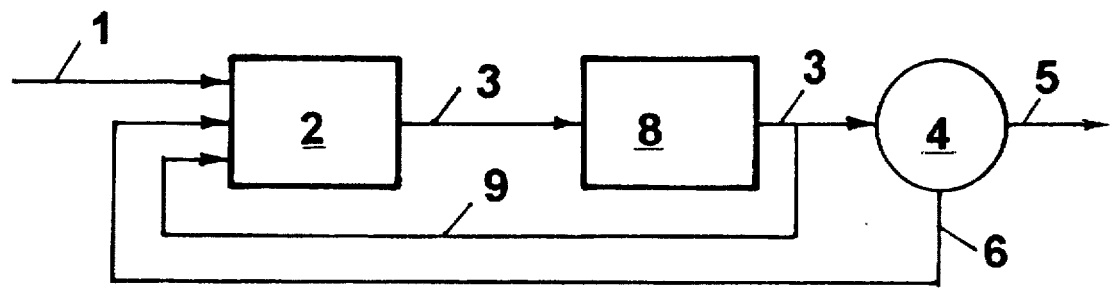
FIG.2
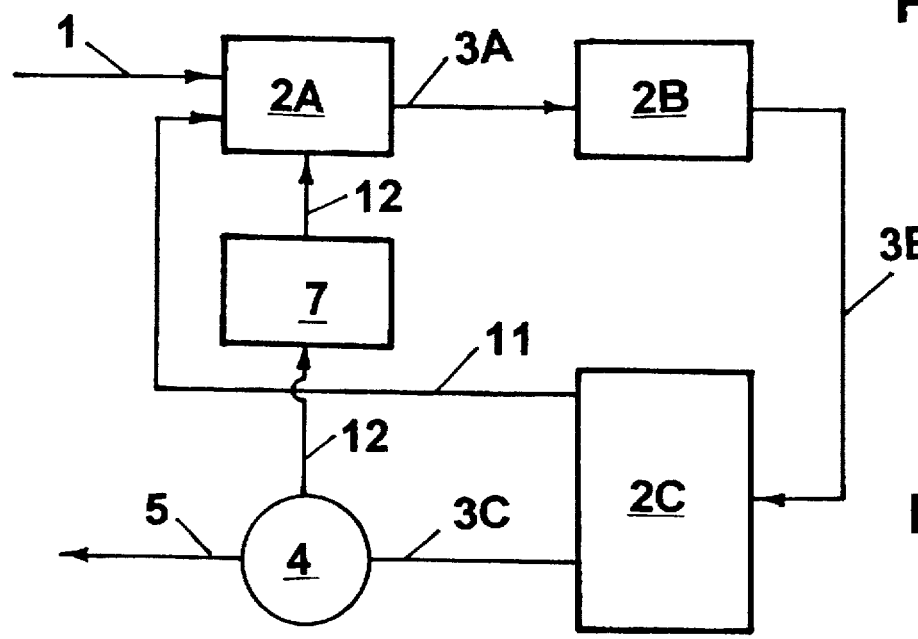
FIG.3
FIG.4A FIG.4C FIG.4E
 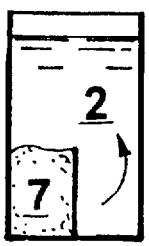 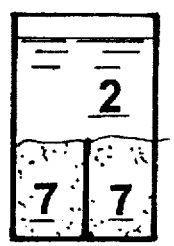 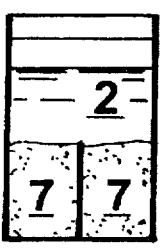 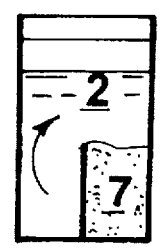
FIG.4B FIG.4D

CONTROL OF ANAEROBIC WASTEWATER TREATMENT

FIELD OF INVENTION

The invention belongs to biological wastewater treatment systems having multiple biological treatment zones, particularly, anaerobic systems, a single-stage racetrack and recycle systems with facultative, anoxic and aerobic zones, and multistage anaerobic-aerobic coupled and combined systems.

BACKGROUND

Advantages of anaerobic treatment are well established. It can be used as a free standing biological process comprising at least an anaerobic reactor a sludge separator, and sludge recycle means. So called anaerobic zones, or sections, are often included in aerobic activated sludge processes for either suppressing the filamentous growth, or for biological phosphorus removal. Such anaerobic zones have a short hydraulic and biomass retention time and can accommodate only acidogenic phase of anaerobic processes, which is performed by facultative organisms. Accordingly, a more appropriate name for these zones is a facultative zone. Anaerobic stages are also included in the coupled and combined anaerobic-aerobic multistage systems. In coupled systems, anaerobic stages are the same as in the free standing anaerobic systems. All anaerobic effluent is clarified in the biomass separation means, and there is no sludge transfer downstream and respective sludge return upstream. Only waste sludge from the downstream stage (usually aerobic) is fed in the anaerobic stage for stabilization. Combined multistage systems have a partial biomass exchange between stages. U.S. Pat. No. 5,514,278 presents an example of combined multistage processes, a counterflow process. This patent is made a part of the present invention by inclusion. In counterflow systems, anaerobic, anoxic, aerobic, and/or polishing stages have biomass separation devices for a portion of the total flow discharged from the stage. The balance of the flow is transferred to a downstream stage as mixed liquor. There is also a return of separated biomass within each stage and to upstream stages. The biomass return to the upstream zones is greater than the flow of the excess biomass. Therefore, in contrast to coupled multistage systems, combined systems have biomass transfer and exchange between and among the process stages. This process arrangement provides additional flexibility, dynamic stability and efficiency.

In all described anaerobic and facultative zones the influent organics are subjected to the acidogenic transformations. Volatile fatty acids (FVA) and carbon dioxide are formed in the acidogenic phase. If the intrinsic alkalinity is not sufficient for neutralization, pH in the anaerobic zone decreases. In presence of VFA, sulfides and odorous volatile organics can form and escape to the digestion gas.

Methanogens are absent in the facultative zone of the activated sludge process and acidification is the only biological process in this zone. Formation of VFA and carbon dioxide causes pH reduction. Low strength waste usually treated in the activated sludge process with facultative zones do not cause significant pH reductions. Normally, pH control is not required. COD is not significantly reduced in facultative anaerobic zones. The ultimate organics degradation occurs in anoxic, and, more important, aerobic zones. Moreover, the portion of the influent COD which is not removable in conventional aerobic processes is at least partially converted to fatty acids and other aerobically degradable substances, thus increasing BOD. This increases the organics removal in the entire system (or per cent COD reduction) and, respectively, boosts the oxygen demand for wastewater treatment.

In free standing anaerobic reactors, and anaerobic zones or stages in coupled and combined systems, pH in the anaerobic reaction zone can substantially change during treatment. VFA and carbon dioxide formed in anaerobic digestion tend to reduce pH. Wastes with low total nitrogen or other source of intrinsic alkalinity, such as predominantly carbohydrate waste, tend to lose alkalinity reserve and become acidic. Waste with high nitrogen content, such as protein containing waste, can result in high alkalinity and pH due to ammonia formation. VFA are at least partially consumed by methanogens in the methanogenic phase of the anaerobic reactions. However, in rapid systems and systems with substantial variations in the influent strength and flow rate, residual VFA concentrations are high. In present systems, pH is most often controlled by systematic addition of reagents. The reagent feed increases the capital and operating costs of the system. The total salt content of the effluent increases, thus making its reuse and disposal more difficult. Due to slow growth of methanogenic organisms, organics removal and VFA accumulation in anaerobic treatment stages is often difficult to control. The process control is especially difficult under variable influent flow rates and concentrations. At reduced process efficiency pH can be low, and odorous volatile organics and hydrogen sulfide can be present in the digestion gas. Treatment of such gases prior to their use is required.

VFA and carbon dioxide in wastewater with large intrinsic alkalinity, for example, with high protein content, are neutralized by the alkalies, such as ammonia, formed in the digestion process. If the influent contains substantial quantity of sodium acetate, the intrinsic alkalinity is due to sodium ions. Other forms of intrinsic alkalinity are also possible. Digestion of the protein rich biological sludges usually results in pH within a neutral range. Anaerobic treatment of some industrial waste, for example, seafood processing, results in very high ammonia release and excessively high pH needing neutralization by an acid. Sometimes, ammonia gas can also be present in the digestion gases. Waste neutralization with alkalies and acids is expensive and complex. Automatic controls for neutralizing anaerobic reactors are not reliable. Several grams of alkalies per liter can often be required for neutralization, thus increasing the total dissolved solids in the effluent and rendering the effluent less valuable for reuse or discharge.

U.S. Pat. Nos. 5,514,277 and 5,616,241 teach a method and apparatus for controlling VFA in anaerobic processes. These patents are made a part of the present invention by inclusion. The anaerobic process is improved by providing a sludge conditioner which is fed with at least a portion of the sludge separated from the anaerobic mixed liquor in the biomass separator. In this sludge, organic particulates and acidogenic organisms are anaerobically digested and the conditioned sludge becomes enriched with methanogens. The sludge rich in methanogens is fed in the reactor, and methanogens rapidly consume the VFA. Controllable feed of the conditioned sludge in the anaerobic reactor regulates acidity due to VFA. This method provides a reliable biological control of acidity due to organic acids in the anaerobic system.

U.S. Pat. No. 4,722,741 describes a method of acidity reduction in anaerobic processes for converting the biomass into methane in a phase separation system comprising an acetogenic reactor, carbon dioxide stripping and methanogenic reactor. The pH control is assumed to occur through stripping the excess carbon dioxide before the methanogenic stage. However, this patent also teaches that the content of carbon dioxide in the methanogenic stage needs to be increased by the use of elevated pressure and high carbon dioxide solubility. About 20 years earlier, S. V. Yakovlev and A. S. Pogosian ("Intensification of digestors by enriching the reaction mass with carbon dioxide", *Vodosnabzhenie i Sanitarnaya Tekhnika*, No. 3, 1967, Moscow) have shown that enriching the digestion media with carbon dioxide increases the methane yields, and the loss of carbon dioxide reduces the efficiency of waste treatment. Therefore, teachings of the U.S. Pat. No. 4,722,741 are contradictory and in conflict with other publications.

The U.S. Pat. No. 4,415,453 presents a further improvement of alkalinity control in anaerobic processes. In a coupled anaerobic-aerobic process, an alkali is added in the anaerobic reactor. A magnesium oxide and sodium hydroxide were used as alkalinic reagents, and sodium formate was used as, what is called here the intrinsic alkalinity. After separating the bulk of biomass in the anaerobic stage, the clarified anaerobic effluent is fed in the activated sludge process. Dissolved carbon dioxide is stripped in the aeration tank and soluble magnesium, or sodium carbonates and bicarbonates are formed. Recycling a portion of the content of the aerobic reactor in the anaerobic stage could reduce the alkali requirements by 50% to 75%. Nonetheless, the required dosages of magnesium oxide (from 1 to 4 g/l) are high. It is assumed in this patent that a magnesium carbonate is formed and precipitated in the aeration tank. It is well known that magnesium hardness cannot be noticeably removed by forming magnesium carbonates at pH equal to or less than 8.5 (normally, the upper pH limit for the activated sludge process). It is well established that magnesium forms poorly soluble hydroxides at pH=10.5. This is the usual operational regime for removing magnesium hardness, but biological treatment systems cannot be operated at this regime. Additionally, magnesium tends to form very difficult struvite ($MgNH_4PO_4$) scale in anaerobic processes.

OBJECTIVES

Accordingly, an objective of the present invention is to control pH and alkalinity in anaerobic and facultative stages and process zones of the wastewater treatment system without systematic feed of reagents.

Another objective is to controllably increase organics reduction in anaerobic zones and to effect organics reduction in facultative zones.

Yet another objective is to reduce the oxygen demand for wastewater treatment in activated sludge system with functional zones for biological nutrient removal and to increase the upper limit of the influent concentrations treatable in such systems.

Additional objective is to produce clean odorless digestion gas with very low emissions of hydrogen sulfide, volatile organics, and ammonia. Increasing the methane content in the digestion gas is also an objective.

Other objectives of the present invention will become clear from the ensuing description.

SUMMARY OF INVENTION

In a biological treatment of wastewater conducted with a biomass in a multi zone system comprising at least one biological zone and at least one abiotic zone the improvement is provided comprising the step of providing at least one recuperable abiotic control specie to at least one of the said zones in the said multi zone system. Further steps comprise separating at least a portion of the said biomass from the said multi zone system, digesting the said separated biomass to produce digested biomass, and feeding at least a portion of the said digested biomass in at least one zone of the said multi zone system. The operation mode of at least one zone in the said multi zone system is selected from a group comprising batch operation, continuous operation, and combinations thereof An alternative formulation of this principles can be as follows. In a biological treatment of wastewater conducted with biomass in a multi zone system comprising at least one biological zone and at least one abiotic zone the improvement is provided comprising steps of separating at least a portion of the said biomass from the said multi zone system, digesting the said separated biomass to produce digested biomass, and feeding at least a portion of the said digested biomass in at least one zone of the said multi zone system, and further providing a step of providing at least one recuperable abiotic control specie to at least one zone of the said multi zone system. The operation mode of at least one zone in the said multi zone system is selected from a group comprising batch operation, continuous operation, and combinations thereof The said wastewater is selected from a group consisting of water, wastewater, aqueous industrial, agricultural and production materials, industrial, agricultural and production gases, polluted air, gaseous and ventilation emissions, solid waste, materials of plant, animal, or fossil origin, and solid industrial, agricultural or production streams, and combinations thereof The said zones in the said multi zone system are selected from a group comprising obligate anaerobic zone, facultative anaerobic zone, anoxic treatment zone, aerobic treatment zone, obligate aerobic zone, abiotic treatment zone, and combinations thereof. The said abiotic zone can be combined with at least one said biological zone selected from the group comprising an obligate anaerobic zone, facultative anaerobic zone, anoxic treatment zone, aerobic treatment zone, and obligate aerobic zone. The connection of the said zones in the said multi zone system is selected from a group consisting of sequential treatment zones, parallel treatment zones, parallel-sequential treatment zones, treatment zones in a racetrack arrangement, and treatment zones with recirculating the said wastewater and the said sludges among and between the said treatment zones. The said biomass in the said zones of the said multi zone system is composed of organisms selected from the group comprising obligate aerobic, facultative aerobic, anoxic, facultative anaerobic, and obligate anaerobic microorganisms, and mixtures thereof.

The said recuperable abiotic control specie is selected from the group comprising calcium, magnesium, iron, nickel, cobalt, manganese, zinc, aluminum, cesium, and combinations thereof The method of introducing the said recuperable abiotic control species is selected from the group comprising zero-valent metals, salts, metal oxides, metal hydroxides, organometallic compounds, and combinations thereof.

DRAWINGS

FIG. 1 is a flowchart of anaerobic process with sludge conditioning.

FIG. 2 is a flowchart of anaerobic treatment with an abiotic control zone.

FIG. 3 is a flowchart of a single-stage race track system with multiple zones.

FIGS. 4A to 4E are charts of a batch treatment system with abiotic process control.

DETAILED DESCRIPTION OF INVENTION

FIG. 1 illustrates anaerobic process with a sludge conditioner as described in the U.S. Pat. Nos. 5,514,277 and 5,616,241. The system comprises an influent line 1, an anaerobic reactor 2, a line 3 for transferring the mixed liquor in a biomass separator 4, an effluent line 5, a sludge recycle line 6 leading to a sludge conditioner 7 and further to the reactor 2. The sludge conditioner 7 is fed with the separated biomass via line 6, where the biomass and other particulate organics are digested and proportion and the absolute mass of methanogenic organisms in the biomass increase. The conditioned sludge enriched with methanogens fed into the reactor 2 via line 6 takes part in consuming VFA. This provides the biological means for increasing the treatment efficiency and for controlling pH and alkalinity deviations due to VFA. High treatment efficiency in the system of FIG. 1 is achieved at a lesser reactor volume than needed for the conventional contact process. Moreover, the reactor-sludge conditioner system can provide the dynamic process control and an excess of methanogens above the equilibrium established in conventional continuous growth reactors, the possibilities not available in the contact process. Additional variants and advantages of this operational mode are presented in U.S. Pat. Nos. 5,514,277 and 5,616,241.

Besides the previously described advantages, the reactor-conditioner system can provide biological-abiotic alkalinity and pH control in the reactor. Nitrogen provided in the reactor is consumed by rapidly growing acidogenic microorganisms. When these organisms are transferred in the sludge conditioner, a large fraction of these organisms dies off thus releasing organic substrate and ammonia. An organic substrate is used for methanogenic growth, while a large portion of nitrogen remains in the solution. Accordingly, pH and alkalinity of the conditioned sludge increase. The contents of the sludge conditioner have an increased concentration of ammonia resulting in pH greater than 7, and reaching 8.5–9. Recycle of this sludge in the reactor provides alkalinity and pH control. In addition to the biological consumption of VFA by the conditioned sludge, recycling of nitrogen species within the reactor-conditioner system is an unexpected benefit. Moreover, at strongly methanogenic ORP, the excess ammonia reacts with carbon dioxide to form methane and water (as in methane production from hydrogen and carbon dioxide) and nitrogen. Ammonia-carbon dioxide (or carbonates) reaction can occur in both, the reactor and the sludge conditioner. This is another new and unexpected phenomena and advantage of the anaerobic reactor with a sludge conditioner. It is now possible to control alkalinity and pH in anaerobic processes with the lack of alkalinity and with the excess of alkalinity due to ammonia.

FIG. 2 shows an anaerobic system with an abiotic zone comprising an influent line 1, an anaerobic reactor 2, a mixed liquor line 3 leading to an abiotic zone 8 and further to a biomass separator 4, an effluent line 5, a mixed liquor recycle line 9, and a separate biomass recycle line 6. The influent treatment in the anaerobic reactor is accompanied by the biomass growth and mixed liquor formation. Stripping carbon dioxide with air or other gas free of carbon dioxide in the abiotic zone 8 results in pH rise and formation of bicarbonates and carbonates. Soluble carbonates and bicarbonates are lost with the effluent from the system, although the recycled portion will help in reducing the alkali requirements. Disadvantages of this approach were presented in the previously discussed teachings of the U.S. Pat. No. 4,415,453. Accordingly, a new and more beneficial method of abiotic process control is needed. Calcium and iron will form very poorly soluble carbonates and their loss will be measured in milligrams, or in a fraction of a milligram per liter. Therefore, these are recuperable species forming insoluble carbonates at acceptable pH (less than 8.5) and are easily available and economical for providing the alkalinity and pH control. The precipitation of the added calcium and/or iron carbonates will occur in the abiotic zone, and the carbonate precipitates will largely embed in the biomass so that little scaling will occur. In the reactor, the precipitated materials are dissolved, the carbonates are converted into bicarbonates, and the alkalinity reserve is used for pH control. Blending calcium and iron reduces the risk of scaling. Other recuperable species can include zinc, nickel, cobalt, manganese, cesium. Through a thorough screening, a skillful in art can find additional recuperable species. It is known that using mixtures of several coagulants, for example iron and aluminum salts, expands the pH range where these salts precipitate and form flocks. Similarly, the use of magnesium together with other coagulating ions, for example, aluminum, iron, zinc, can trigger magnesium precipitation at pH values much lower than 10.5 typical for the removal of magnesium hardness. Therefore, magnesium blended with other ions can sometimes also be recuperated in the abiotic zone. Such blending will also reduce the risk of struvite scaling due to lowering the magnesium concentration and binding of phosphates by other recuperable species, particularly by iron. Blending other metals, for example iron and calcium, can also reduce the risk of calcium carbonate scaling in the treatment system. Moreover, calcium improves the ferrous hydroxide precipitation and iron recuperation in an abiotic zone. Therefore, blending several recuperable species produces unexpected and very beneficial synergistic effects.

Another group of unexpected benefits is related to the abiotic oxidation-reduction processes. For example, ferrous ions in the anaerobic mixed liquor aerated in the abiotic zone can be oxidized to ferric ions. Ferric hydroxide can be recuperated at much lower pH than either ferrous carbonate or ferrous hydroxide. Return of ferric forms in the anaerobic reactor helps to oxidize and otherwise treat toxic and recalcitrant organics, including many halogenated organics. Reduction of ferric forms to ferrous in the anaerobic reactor also provides additional alkalinity. Iron and some other recuperable species produce an additional unexpected and beneficial result. In an anaerobic reactor, iron binds sulfides, thus eliminating the hydrogen sulfide in the digestion gas. In aerated abiotic zones, iron sulfide is oxidized forming soluble sulfates and insoluble iron forms. Sulfates are discharged with the effluent, while insoluble iron forms are recuperated to be used as an oxidation agents (reduction of ferric to ferrous forms), as an alkalinity carrier, as a coagulant, and as a precipitating agent for sulfides and phosphates. Manganese, copper, magnesium and other ions can catalyze iron oxidation in aerated abiotic zones directly and through pH Increase. This is one more benefit of using blends of recuperable abiotic species.

Yet another unexpected benefit is in producing digestion gases with significantly increased methane percentage. The bulk of the recuperable species returned in the anaerobic reactor is carbonates and hydroxides. These carbonates and hydroxides react with the anaerobically generated carbon dioxide to produce soluble nonvolatile bicarbonates. Simultaneously, pH in the aerobic reactor increases and the proportion of carbon dioxide to bicarbonates rapidly decreases. For example, at pH=7.5, the mole ratio of carbon dioxide to bicarbonates is 0.08 to 0.92, whereas at pH=7, this ratio is 0.19 to 0.81. Therefore, operating the anaerobic process with elevated pH results in much higher methane content in the gas. More than 90% and often more than 95% methane gas can be produced. This is the commercial quality gas which can be sold to utilities. Since pH is controlled at a high level by recuperable abiotic species, the cost of such control is low. After the initial charging, the need in replenishing the recuperable abiotic species is very low.

The recuperable ions can be introduced in the system as salts, metal oxides, metal hydroxides, organometallic compounds. Zinc, aluminum, iron, nickel, cobalt can be introduced as zero-valent metals. Additional benefits of zero valent metals are described in the U.S. Pat. No. 5,348,629 which is made a part of this invention by inclusion. A further improvement can be provided by using ferric salts for striking zero-valent metals to trigger the rapid dissolution and activation of zero-valence metals. Moderate oxygenation of water in the abiotic zones increases the rate of zero-valent metal dissolution and the rates of destruction of recalcitrant and toxic organics. Ferric ions are not toxic and, by themselves and upon reaction with metallic iron, they will introduce additional quantity of recuperable iron species. In an anaerobic zone, ferric ions will be reduced to ferrous ions and some organics will be electrochemically treated, including recalcitrant and toxic organics. Besides being a recuperable abiotic specie in the process of concern, such as iron and other ions, are also beneficial for dewatering the excess sludge, for biomass separation in anaerobic processes, for phosphorus control, and for control of sulfides. This is additional unexpected benefit of the new process. Losses of the recuperable abiotic species occur with the waste sludge and as a residual dissolved matter with the effluent. These losses are very low. The replenishment quantity of the recuperable abiotic species is only $1/1000$ to $1/25$ of the alkali required for neutralization in the once-through system. This is also a great reduction as compared with the U.S. Pat. No. 4,415,453 (by an additional factor of 10 to 250).

FIG. 3 shows a race track treatment system comprising an influent line 1, an anoxic treatment zone 2A with the transfer line 3A leading to the anaerobic treatment zone 2B followed by another transfer line 3B leading to an aerobic treatment zone 2C with the first outlet line 11 conveying the circulating flow to the anoxic zone 2A and the second outlet line 3C leading to a biomass separator 4 and further to the effluent line 5, the biomass separator has a line 12 connected to a sludge conditioner 7 and further leading to the anoxic zone 2A. Many variants of this system are possible. For example, the line 12 can connect to zones 2B, or 2C. Zones 2A, 2B, and 2C can be separate reservoirs (tanks, or reactors of any kind), or they can be functional zones without defined borders in a single oval or circular tank as in the oxidation ditch treatment system, or they can be accommodated in the conventional corridor type aeration tanks. Number of zones can also vary. For example, zones 2A and 2B can be combined into a single denitrification-anaerobic zone. Other functional zones can be added. Using the present teachings, skillful in art can design various systems. Note that the usual order of functional zones in biological nutrient removal systems is anaerobic-anoxic-aerobic. By providing the appropriate sludge and wastewater transfer means, this sequence and other common modifications can also be used with the present invention.

The system shown in FIG. 3 is operated as follows. Wastewater is fed in zone 2A via line 1. Mixed liquor is circulated in this zone via line 11, and the conditioned sludge is fed through line 12. In zone 2A, oxygen is rapidly depleted and nitrites and nitrates are reduced to form mainly nitrogen. The hydrolysis of organic particulates and anaerobic acidification of the influent waste may also start in this zone. After the mixed liquor is transferred in zone 2B, organics are acidified and, with the participation of methanogens provided from the sludge conditioner, at least partially converted to methane. During anoxic and anaerobic treatment, the wastewater pH declines due to generation of VFA and carbon dioxide. Depending on the supply of the conditioned sludge, VFA can be consumed at least partially by the methanogens. Upon transferring the mixed liquor in the aerobic zone 2C, it undergoes aerobic biological polishing, and the carbon dioxide accumulated in the anaerobic zone 2B is stripped during the wastewater aeration. After complete VFA consumption and carbon dioxide stripping in anaerobic and aerobic zones 2B and 2C, the wastewater pH rises. Sludge separated in the biomass separator 4 is conditioned in the sludge conditioner 7 and becomes enriched with methanogens. The separated water is discharged via effluent line 5. All features related to the use of recuperable abiotic species separately or in conjunction with the sludge conditioning described above while discussing FIGS. 1 and 2, are applicable for the system shown in FIG. 3 and will not be repeated. In the system of FIG. 3, the function of the aerated abiotic zone is combined with the function of the aerobic treatment in zone 2C. The pH range in zones 2A, 2B, and 2C depends on the initial wastewater composition and the design parameters of the system. It can be controlled most conveniently by the recycle rates of wastewater and conditioned sludge. Increasing the recycle rates reduces the range of pH change in zones 2A, 2B, and 2C. Further control can be provided by adding the recuperable abiotic species to any point in the treatment system, but the effluent line 5 and the discharge line for the excess sludge (not shown). The conversion of the recuperable species into bicarbonates in the anaerobic zones and into carbonates and hydroxides in aerobic zones has already been described. Additionally, reduced ions (ferrous) will be oxidized in the aerobic zone (ferric). In the anaerobic zone, reductions of ferric ions can produce very powerful oxidations for many toxic and recalcitrant organics, including halogenated compounds. This is another unexpected advantage of using iron as a recoverable abiotic specie, singly or in combination with other species.

Race track systems are commonly used for treating low to moderately concentrated wastewater. An unexpected and very valuable advantage of the improved system shown in FIG. 3 is in that it can be used from low to highly concentrated wastewater and for anaerobic-aerobic sludge digestion. This is achieved by the use of recuperable abiotic species for alkalinity control. Further, this is achieved by significantly reducing COD in anaerobic, and, to a lesser extent, in anoxic zones 2B and 2A. For any wastewater strength, COD reduction in zones 2A and 2B via anaerobic mechanisms greatly reduces the oxygen requirements and cost of aeration in the system overall. Sludges and concentrated waste can be biologically heated in aerobic zones. In this and other embodiments, besides the gravity separators, a filter press, a belt filter, a centrifuge, a dissolved gas (including air) flotation, or other means can be used as sludge separators. The sludge separation can be conducted in more than one step, for example, with a gravity separator or a filter in the second separation step. When iron or other specie with a variable valency is used, the sludge mass is additionally significantly reduced due to oxidation by the ferric ions. Moreover, in all described process modifications, the excess sludge wasted from the biological treatment system is already coagulated. Therefore, the added recuperable abiotic species will be also coagulants in the sludge treatment at no additional cost. This are also unexpected benefits of this invention.

For concentrated wastewater, a multistage system with coupled or combined stages, including the system with a sludge exchange between the anaerobic and aerobic stages can be preferable. Sludge exchange can be organized as shown in the U.S. Pat. No. 5,514,278, which is made a part of this invention by inclusion. In line with the present teaching, skillful in art can design alternative configurations of the process with the sludge exchange between and among stages in a multistage processes. A portion of the mixed liquor from upstream stages is transferred to a downstream stage directly, and the balance of the flow passes through the biomass separator. The quantity of sludge allowed downstream and the additional sludge grown in the downstream sections are recycled upstream. Therefore, the sludge recycle exceeds the excess sludge flow. Transferring the biomass downstream results in substantial sludge and wastewater recycle between stages. Accordingly, the required concentration of the recuperable species in the circulating flows is substantially reduced, and the mass of these species in the system is also reduced. In conventional multistage systems, including one described in the U.S. Pat. No. 4,415,453, no controllable transfer of sludge downstream is allowed and only the excess sludge generated in the downstream stages is recycled to the upstream stages. Accordingly, the recycle flow between stages is small and the required concentration of the recuperable species must be high. If magnesium alone is used at high concentrations, it can reach toxic levels, struvite will be readily formed, and losses of magnesium with the effluent will be large. All features related to the use of recuperable abiotic species separately or in conjunction with the sludge conditioning described above while discussing FIGS. 1 and 2, are applicable for the system shown in FIG. 3 and will not be repeated. It is understood that the multistage systems may have separate abiotic zones, or abiotic functions can be combined with biological functions in biological treatment zones.

FIGS. 4A to 4E illustrate the use of the present method in a batch mode. The batch system consists of at least one reactor 2 with optional sludge conditioning sections 7, the means for filling the influent and discharging the effluent, mixing means, means for stripping carbon dioxide, and feed means for the recuperable abiotic species. Only the reactor and sludge conditioning zones are shown in FIGS. 4A to 4E. Other means are familiar to those skillful in art and are not discussed here. The system is operated as follows. After the start up and accumulation of biomass in the reactor 2, wastewater is filled in the reactor from the level of the settled biomass to the operable level and the treatment step proceeds over the required time. Simultaneously, carbon dioxide is at least periodically stripped from the reactor and the content of the reactor is mixed by a mechanical mixer, water jets, or gaslifts, including airlifts, or otherwise. The same airlifts used for mixing can be used for carbon dioxide stripping. In such a case, the abiotic zone is the internal volume of the airlift. Such arrangement of the abiotic zone can be used in other systems described herein or designed later. A special air stripping, or other means can also be provided. More appropriately, these process steps should be called the fill-strip and react-strip steps. Upon completion of the react-strip step, mixing is terminated, and the settling step is conducted. After settling, the decanting step is conducted by discharging the top treated and clarified layer of liquid. After that the entire cycles of process steps, including fill-strip, react-strip, settle, and decant steps, are repeated.

Optionally, a volume of the reactor at the bottom can be assigned as a sludge conditioner and a fraction of this volume can be engaged in each cycle. Alternatively, multiple sludge conditioning sections can be used and each section can be employed on a rotation basis with the first, second, and following cycles. Recuperable abiotic species can be added to the batch reactor. During the treatment cycle the recuperable abiotic species will change from the dissolved to precipitated form at the end of the treatment step. Accordingly, these species will be settled and retained in the reactor during the decant and discharge steps. All features related to the use of recuperable abiotic species separately or in conjunction with the sludge conditioning described above while discussing FIGS. 1 and 2, are applicable for the system shown in FIGS. 4A to 4E and will not be repeated.

All embodiments described herein can be combined as needed for a particular application. Many other combinations can also be designed in the spirit and letter of these teachings.

In all embodiments described herein, digestion gas is generated in the anaerobic process stage. This gas can be made odorless by providing sufficient amounts of methanogens with the conditioned sludge, and sufficient amounts of the recuperable abiotic control species. Gas can be produced with high methane and low carbon dioxide contents. Such a gas can be collected and utilized, if economical. Alternatively, this gas can be destroyed, for example, by combustion on a flare.

The use of recuperable abiotic control species singly or together with the sludge conditioning affords a simple and reliable dynamic process control system. Using an excess of the recuperable abiotic control species will result in continuously recycling a fraction of these species in carbonate form between the anaerobic and abiotic (or aerobic) zones. Carbonates will support the higher limit pH in the anaerobic zone all the time but during the maximum loading rate on the system, when the excess of carbonate form of the recuperable abiotic species will be spent. Therefore, alkalinity loss due to carbon dioxide will be controlled without any instrumentation, on/off or the variable rate operation of metering pumps. If the alkalinity loss due to carbon dioxide persists, the recycle rate between the anaerobic and abiotic zones should be temporarily increased. The use of the sludge conditioning for dynamic controls should also include the excessive conditioned sludge recycle so that the need in the VFA consumption by methanogens is always satisfied. If alkalinity loss due to VFA persists, the recycle rate of the conditioned sludge should be temporarily increased. In extreme situations, the needs in increasing the recycle of the conditioned sludge or the recuperable abiotic species is determined in the following sequence. The pH of the wastewater in the anaerobic reactor is continuously monitored. When pH reading is at the lower set point, the conditioned sludge recycle is increased. If the observed pH does not increase, the pH drop is, probably, not attributable to VFA and the conditioned sludge recycle is returned to the normal rate. The recycle of the recuperable abiotic species is than increased and pH change is observed. If pH rises above the lower set point, the system is run at the increased recycle of the recuperable abiotic species and is periodically probed for the possible return of this recycle to the normal setting. If after the return pH does not decrease below the lower set point, the normal setting remains. If the return causes pH to drop, the increased recycle is continued. If pH keeps declining at the increased recycle of the recuperable abiotic species, recycle of the conditioned sludge is increased again. Periodically, the system is probed for normal settings of both recycles.

The completeness of carbon dioxide stripping and conversion of carbonic acid species to carbonates can be checked by measuring pH in the bulk volume of the abiotic zone and in a portion of the same liquid added with a strong alkali, preferably $Ca(OH)_2$. If addition of $Ca(OH)_2$ does not rise pH, not all bicarbonates are converted to carbonates in the abiotic zone. Accordingly, the rate of aeration should be increased. Periodically probing the lime-added sample for pH and monitoring the pH in the bulk and correcting the air flow rate provides the control of the abiotic zone used for the recuperation of the abiotic species.

The pH probes in the anaerobic and abiotic zones can be used together with other probes, for example, a probe for carbon dioxide, ORP, temperature, flow meters, and others. Therefore, the pH measurement can be used to control the carbon dioxide stripping, addition of the recuperable abiotic species, and recycle of wastewater and sludges in various systems described here or designed in accordance with these teachings.

EXAMPLES

A full scale three-stage anaerobic-aerobic system with a sludge conditioner at a pharmaceutical plant was charged with lime (dry calcium oxide charged in the anaerobic stage) during a three-month start up period to control pH and was operated for two more years without any alkali addition. Calcium was functioning as a recuperable abiotic specie. No calcium carbonate scaling was detected in the system.

Computational analyses of anaerobic-aerobic counterflow system for treatment of carbohydrate wastewater with very low intrinsic alkalinity showed that calcium and calcium-iron combination can be used as recuperable abiotic species with very low replenishment requirements, mainly for losses of these species with wasted sludge. The required concentration of recuperable species is inversely proportional to the recycle rate of the wastewater and mixed liquor combined.

It will therefore be understood by those skilled in the art that particular embodiments of the invention here presented are by way of illustration only, and are meant to be in no way restrictive; therefore numerous changes and modifications may be made, and the full use of equivalents resorted to, without departing from the spirit and the scope of the invention as outlined in the appended claims.

What is claimed is:

1. In a method for controlling treatment of wastewater conducted with biomass in a multi step system comprising at least one anaerobic treatment step and at least one carbon dioxide stripping step, wherein the said wastewater and the said biomass are sequentially treated in the said at least one anaerobic treatment step and the said at least one carbon dioxide stripping step the improvement is provided comprising the step of charging at least one recuperable abiotic control specie to at least one step in the said multi step system, whereby the said abiotic control species form insoluble carbonates or hydroxides in the said at least one carbon dioxide stripping step and at least partially convert into soluble bicarbonates in the said at least one anaerobic step.

2. The method as claimed in claim 1, and further providing steps of separating at least a portion of the said biomass from the said multi step system, digesting the said separated biomass to produce digested biomass, and feeding at least a portion of the said digested biomass in at least one step of the said multi step system.

3. The method as claimed in claim 2, and further providing steps of pH measurement in the said anaerobic step, varying the rate of feeding the said digested biomass in at least one step in the said multi step system, and varying the recycle rate of the said insoluble carbonates from the said at least one carbon dioxide stripping step to the said at least one anaerobic step.

4. The method as claimed in claim 3, and further providing steps of differential pH measurement and controlling efficiency of the said at least one step of carbon dioxide stripping.

5. The method as claimed in claim 1, wherein the said wastewater is selected from the group comprising water, wastewater, aqueous industrial, agricultural and production materials, industrial, agricultural and production gases, polluted air, gaseous vent emissions, solid waste, materials of plant, animal, or fossil origin, and solid industrial, agricultural or production streams, and combinations thereof.

6. The method as claimed in claim 1, wherein the operation mode of at least one step in the said multi step system is selected from the group comprising batch operation, continuous operation, and combinations thereof.

7. The method as claimed in claim 6, wherein the said batch operation mode comprises steps of filling-stripping, reacting-stripping, settling, and decanting the said wastewater.

8. The method as claimed in claim 7, and further providing a step of sludge conditioning.

9. The method as claimed in claim 1, wherein the said carbon dioxide stripping step is combined with at least one step of the said multi step system selected from the group comprising an obligate anaerobic se facultative anaerobic step, anoxic treatment step, aerobic treatment step and obligate aerobic step, and combinations thereof.

10. The method as claimed in claim 1, wherein the arrangement of the said steps in the said multi step system is selected from a group comprising sequential treatment steps parallel treatment steps, parallel-sequential treatment steps, treatment steps in a race track arrangement, and treatment steps with recirculating the said wastewater and the said biomass among and between the said steps, and combinations thereof.

11. The method as claimed in claim 1, wherein the said biomass in the said steps of the said multi step system is composed of organisms selected from the group comprising obligate aerobic, facultative aerobic, anoxic, facultative anaerobic, and obligate anaerobic microorganisms, and mixtures thereof.

12. The method as claimed in claim 1, wherein the said recuperable abiotic control specie is selected from the group comprising calcium, magnesium, zinc, aluminum, iron, nickel, cobalt, manganese, cesium, and combinations thereof.

13. The method as claimed in claim 12, wherein the said recuperable abiotic control specie is selected from the group comprising zero-valent metals, salts, metal oxides, metal hydroxides, organometallic compounds, and combinations thereof.

14. The method as claimed in claim 1, wherein digestion gas is generated in the said anaerobic step, and further providing steps selected from a group comprising discharging the said digestion gas to the atmosphere, utilizing the said digestion gas, combusting the said digestion gas for elimination, and combinations thereof.

* * * * *